United States Patent [19] [11] 4,403,234
Miura et al. [45] Sep. 6, 1983

[54] INK JET PRINTING HEAD UTILIZING PRESSURE AND POTENTIAL GRADIENTS

[75] Inventors: Masayoshi Miura, Kawasaki; Hiroshi Naito, Machida, both of Japan

[73] Assignee: Matsushita Electric Industrial Company, Limited, Osaka, Japan

[21] Appl. No.: 341,199

[22] Filed: Jan. 20, 1982

[30] Foreign Application Priority Data

| | | | |
|---|---|---|---|
| Jan. 21, 1981 | [JP] | Japan | 56-8428 |
| Mar. 11, 1981 | [JP] | Japan | 56-35711 |
| Mar. 11, 1981 | [JP] | Japan | 56-35713 |
| Dec. 9, 1981 | [JP] | Japan | 56-199292 |
| Dec. 29, 1981 | [JP] | Japan | 56-212867 |

[51] Int. Cl.³ ..... G01D 15/18
[52] U.S. Cl. ..... 346/140 R
[58] Field of Search ..... 346/1.1, 75, 140

[56] References Cited

U.S. PATENT DOCUMENTS

| | | | |
|---|---|---|---|
| 4,031,563 | 6/1977 | Paranjpe et al. | 346/140 IJ X |
| 4,167,742 | 9/1979 | Head et al. | 346/75 |
| 4,272,773 | 6/1981 | Halasz | 346/140 A X |
| 4,293,865 | 10/1981 | Jinnai et al. | 346/140 PD |
| 4,312,009 | 1/1982 | Lange | 346/140 PD |

FOREIGN PATENT DOCUMENTS

| | | | |
|---|---|---|---|
| 54-160242 | 12/1979 | Japan | 346/140 R |

*Primary Examiner*—Donald A. Griffin
*Attorney, Agent, or Firm*—Lowe, King, Price & Becker

[57] ABSTRACT

An ink jet printing head comprises laminar airflow chamber having a front channel through which a combined stream of air and ink droplets is discharged toward a writing surface, and a rear channel axially aligned with the front channel connected to a source of liquid. The chamber is further provided with an air intake connected to a pressurized air supply source for directing an airstream to a point between the front and rear channels so that the airstream makes a sharp turn at the entry into the front channel with the result that a sharp pressure gradient is produced in the liquid discharge path. An electrode is provided for establishing a field between the front channel and the liquid's meniscus at the exit end of the rear channel to cause the latter to extend toward the front channel by combined effects of the potential and pressure gradients and to be torn apart into a droplet which is carried by the airstream discharged through the front channel.

34 Claims, 24 Drawing Figures

INK JET PRINTING HEAD UTILIZING PRESSURE AND POTENTIAL GRADIENTS

BACKGROUND OF THE INVENTION

The present invention relates generally to nonimpact printing heads, and in particular to a novel ink jet printing head in which the effects of air pressure gradient and electric field are combined to form a jet stream of ink droplets.

It is known in the art to utilize electric field potentials to form a jet stream of ink droplets. The ink jet printer of this type comprises a plate electrode on which recording medium is placed. A liquid nozzle is pointed toward the electrode and biased negative with respect to the electrode. By a strong concentration of field at the meniscus of the liquid, the latter is attracted toward the electrode and torn apart into a droplet which is pulled toward the electrode and creates an image on the recording medium. However, the conventional system requires a considerably high operating voltage and results in a relatively large construction which makes it difficult to achieve multiple nozzle design for high speed printing.

SUMMARY OF THE INVENTION

The primary object of the invention is therefore to provide an ink jet printing head which is capable of high-speed, low-voltage operation and allows compact design.

According to the invention, the ink jet printing head comprises a laminar airflow chamber having a front channel through which a combined stream of air and ink droplets is discharged toward a writing surface, and a rear channel axially aligned with the front channel connected to a source of liquid. The chamber is provided with an air intake connected to a pressurized air supply source for directing an airstream to a point between the front and rear channels so that the airstream makes a sharp turn at the entry into the front channel. This creates a sharp pressure gradient in the liquid discharge path. An electrode is provided for establishing an electric field between the front channel and the meniscus of the liquid in the rear channel to cause the latter to extend toward the front channel by combined effects of the potential and pressure gradients and to be torn apart into a droplet which is carried by the airstream discharged through the front channel.

BRIEF DESCRIPTION OF THE DRAWINGS

The invention will be described in further detail with reference to the accompanying drawings, in which.

DETAILED DESCRIPTION

Figure 1:
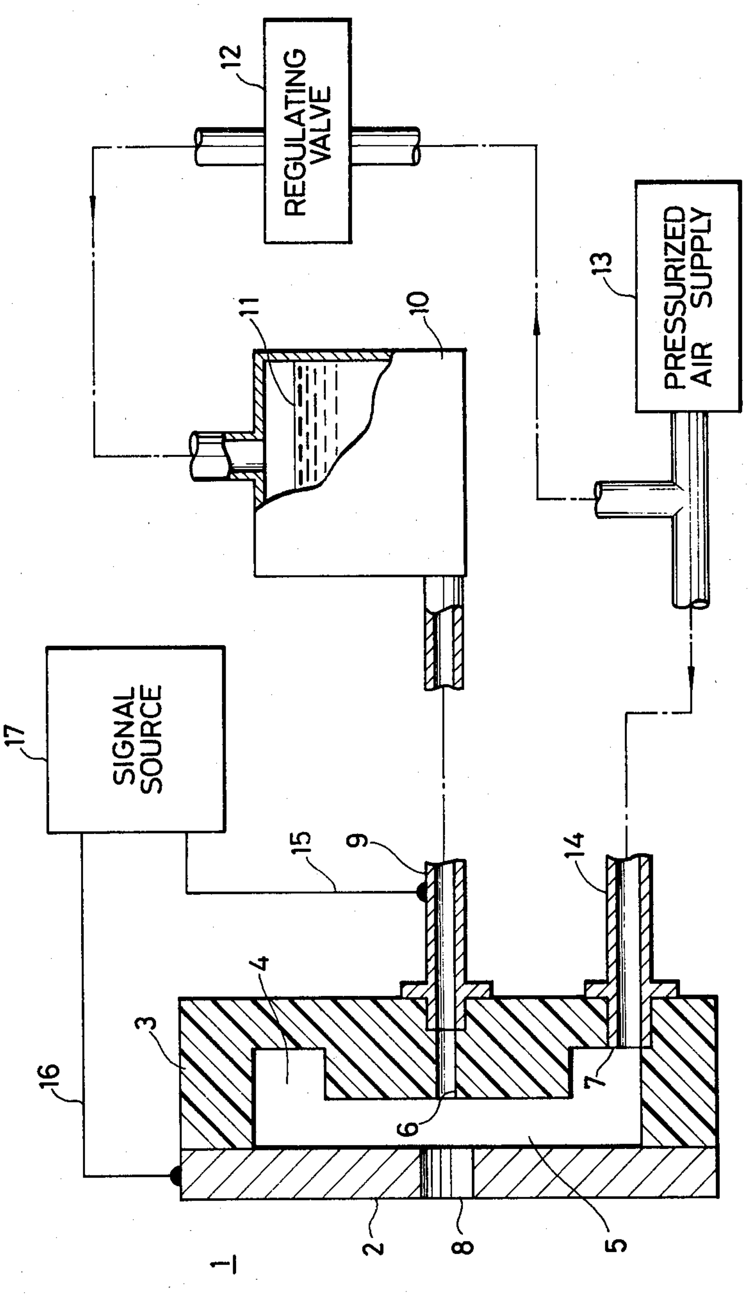
FIG. 1 is an illustration of an embodiment of the ink jet printer of the invention.

Referring now to FIG. 1, there is shown a preferred embodiment of the ink jet printing head of the invention and its associated devices. The printing head 1 comprises a front panel 2 of conductive material which serves as an electrode for establishing an electric field and a rear block 3 of insulative material secured thereto. The rear block 3 is annularly grooved to define with the front panel 1 an outer or annular air chamber 4 which serves as a reservoir and is rearwardly recessed to define with it an inner disk-like laminar airflow chamber 5. The rear block 3 is formed with a liquid discharge channel or nozzle 6 concentrical to the chambers 4 and 5 and an air intake channel 7 adjacent to the annular chamber 4. The front plate 2 is provided with an air discharge channel or nozzle 8 which is axially aligned with the liquid discharge channel 6 and has a larger cross section than the cross section of the liquid discharge channel 6 to permit a combined stream of air and liquid to be discharged therethrough toward a writing surface, or recording sheet, with respect of which the printing head 1 is reciprocally moved in a conventional manner. A liquid supply conduit 9 of conductive material is connected to the liquid discharge 6 channel to supply ink or colored liquid from a liquid source 10. The liquid 11 in the container 10 is pressurized by compressed air supplied via a regulating valve 12 from a pressurized air supply source 13. The latter also supplies compressed air through a conduit 14 to the inlet opening 7 of the printer head 1. The air introduced to the air chamber 4 flows radially inwardly toward the air discharge channel 8 where it is sharply bent in a manner as will be described later and discharged therethrough to the writing surface. The liquid supply conduit 9 and front panel 1 are connected by lead wires 15 and 16 respectively to terminals of a unipolar pulse source 17 so that the liquid in channel 6 is electrostatically biased to a given polarity to develop an electric field between its meniscus and the air discharge channel 8.

Figure 3:
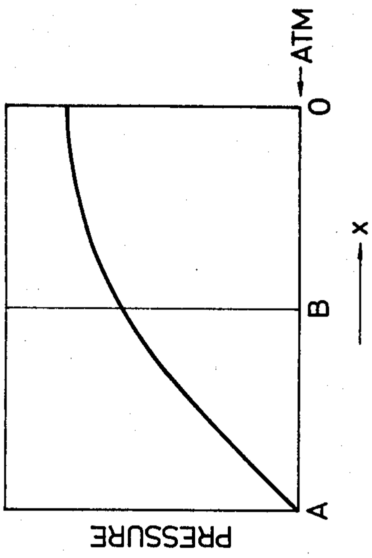
FIG. 3 is an illustration of a pressure curve as a function of distance along the liquid discharge path.
Figure 4:
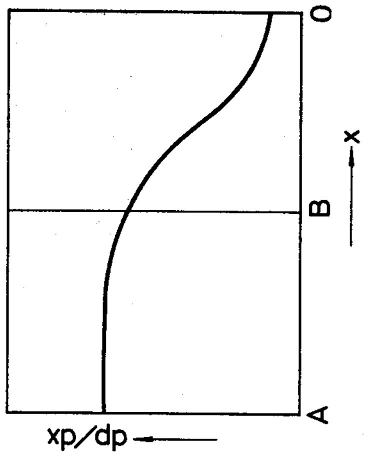
FIG. 4 is an illustration of a gradient curve which is the derivative of the pressure curve of FIG. 3.
Figure 2:
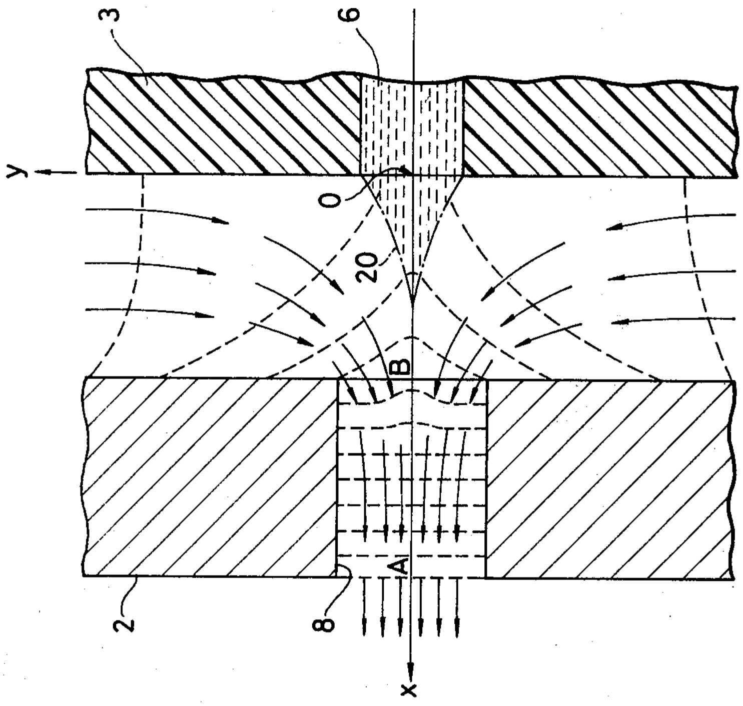
FIG. 2 is an illustration of details of the discharge channels of the printing head for describing the operation of the invention.

FIG. 2 is an illustration of the detail of the liquid and air discharge channels 6 and 8. Since the air discharge channel 8 extends at right angles to the direction of radially inwardly directed airflow, the air makes a sharp turn at the entry to the air discharge channel 8 as indicated by solid lines, so that air pressure changes rapidly as a function of distance in the liquid discharge path as indicated by isobaric, or constant-pressure lines (dotted lines). As shown in FIG. 3, the point A at the exit end of the air discharge channel 8 is substantially at atmospheric pressure. The pressure in the path increases linearly as a function of distance from point A to the inlet end of the air discharge channel 8, indicated at "B". The rate of pressure variation then decreases as a function of distance from point B to the exit end of the liquid discharge channel 6, indicated at "O", where the pressure is at the highest. The pressure gradient (FIG. 4) thus created in the liquid discharge path exerts on the liquid after leaving the discharge channel 6 to tear it apart into a droplet with a force increasing as function of distance from the point O.

The regulating valve 12 is manually adjusted in the absence of an electric field so that the liquid pressure in the discharge channel 6 is statically balanced against the combined force of the air pressure acting on the meniscus of the liquid and its surface tension until the latter comes to a position slightly forward of the point O. When electric field is applied the liquid is electrostatically charged with respect to the air discharge channel 8 and drawn out of channel 6 so that its meniscus takes the shape of a cone as shown as 20. Due to the increasing pressure gradient, the pulling force increases as the liquid is drawn near the point B and further toward point A. Therefore, in response to the application of a unipotential pulse the liquid is torn off readily into a droplet under the combined gradients of electrical potential and air pressure. The droplet is carried by the airstream and expelled at a high speed through the discharge channel 8 to a recording medium.

In a practical embodiment of the invention, the air pressure acting on the meniscus is preferably in a range from 0.03 to 0.2 kilograms/$cm^2$. With the air pressure of this range, an air speed of about 40 to 150 meters/second is attained at the discharge end of the channel 8. A preferred value of the diameter of air channel 8 is approximately 250 micrometers or less to ensure that the air is discharged in a laminar flow.

For proper operation of the printing head of the invention, it is desirable that the meniscus at the exit end of liquid channel 6 return rapidly to a stabilized state when the electrical potential is reduced to zero. This is accomplished by appropriately dimensioning the diameter of liquid channel 6 in relation to the surface tension of the liquid used since the meniscus is retained by a holding power T/r, where T is the liquid's surface tension and r is the radius of the meniscus. For a given value of surface tension which usually ranges from 20 to 70 dyn/cm, the appropriate value of the diameter of channel 6 is up to 100 micrometers depending on the liquid's viscosity.

The thickness of the disk-like air chamber 5 is preferably in a range from 20 to 100 micrometers which assures a smooth airflow of sufficient speed to produce the pressure gradient just described. For this purpose the ratio of the thickness of air chamber 5 to the diameter of air discharge channel 8 is preferably 2.5:1. For manufacturing purposes, the front panel 2 has a thickness value preferably ½ to 5 times of the diameter of air discharge channel 8.

Figure 5:
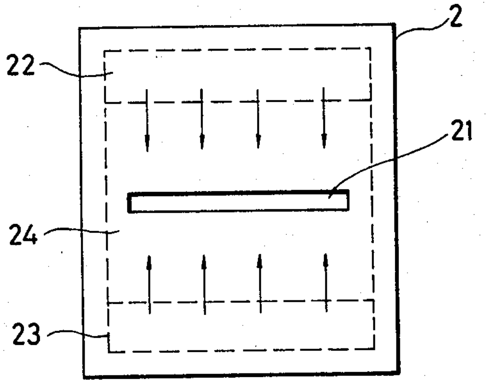
FIG. 5 is an illustration of a modified printing head of the invention.
Figure 6:
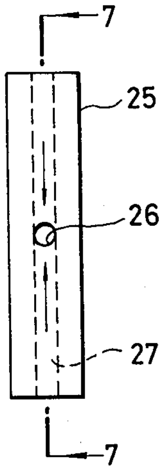
FIG. 6 is an illustration of a further modified printing head.
Figure 7:
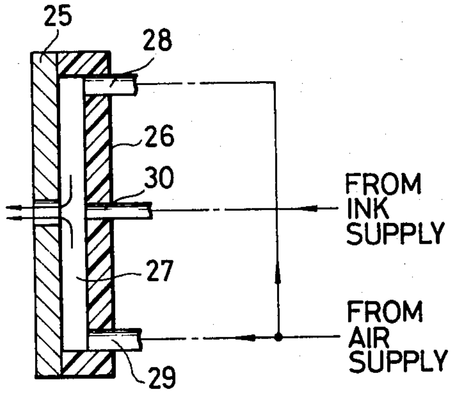
FIG. 7 is a cross-sectional view taken along the lines 7—7 of FIG. 6.
Figure 8:
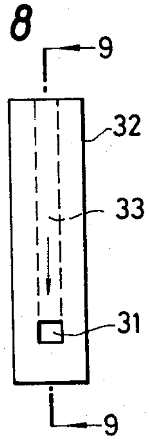
FIG. 8 is an illustration of a still further modified printing head.
Figure 9:
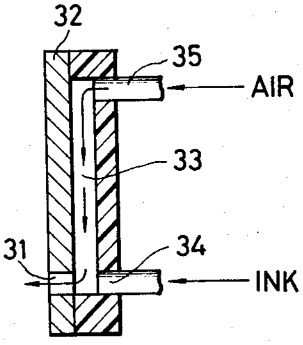
FIG. 9 is a cross-sectional view taken along the lines 9—9 of FIG. 8.

The printing head of FIG. 1 was found to satisfactorily operate at a potential of about 900 volts with the following parameters:

Diameter of air channel 8 . . . 150 micrometers
Diameter of liquid channel 6 . . . 70 micrometers
Thickness of air chamber 5 . . . 100 micrometers
Thickness of front panel 2 . . . 200 micrometers
Velocity of discharged air . . . 100 m/s The printing head of FIG. 1 can be modified into various forms as illustrated in FIGS. 5 to 9. In FIG. 5, the front panel 2 has a rectangular shape and the air discharge channel 8 is elongated as shown at 21. The annular air is replaced with a pair of rectangular chambers 22 and 23 from which air is drawn to the nozzle 21 through a rectangular flat chamber 24 which replaces the disk-like chamber 5. A plurality of liquid nozzles, not shown, could be provided in a horizontal row in alignment with the slit nozzle 21. With this arrangement, each liquid channel could be independently supplied with signals from different sources to achieve a multiple nozzle head. In FIGS. 6 and 7, the front panel is an elongated member 25 having a needle air channel 26 axially aligned with a liquid channel 30. The rear block 27 is provided with a vertical slot 27 which terminates at upper and lower air inlet openings 28 and 29 connected to the air supply source 13 so that air is directed to the air discharge channel 26 in opposite directions. In FIGS. 8 and 9, a rectangular cross-section channel 31 is provided in a nozzle member 32 at the bottom of a vertical slot 33 in alignment with a liquid discharge channel 34, an air inlet port 35 being formed at the upper end of the slot 33.

Figure 10:
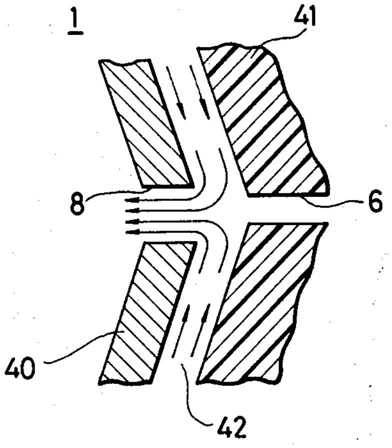
FIG. 10 is an illustration of a further preferred embodiment of the printing head in which the airstream passage is inclined at an acute angle to the air discharge channel.
Figure 11:
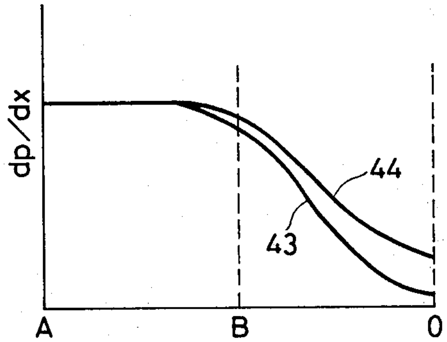
FIG. 11 is an illustration of gradient curves associated with the printing heads of FIGS. 1 and 10.

It is desirable that the pressure gradient be as high as possible. In FIG. 10, the printing head 1 has a modified air nozzle plate 40 which is cone-shaped toward the rear block 41 and the latter is correspondingly recessed to form a cone-shaped air chamber 42 so that the airflow path makes an acute angle to the liquid discharge path. As graphically shown in FIG. 11, the pressure gradient of the embodiment of FIG. 10 has a curve 43 which is favorably compared with a curve 44 exhibited by the FIG. 1 embodiment.

Figure 12:
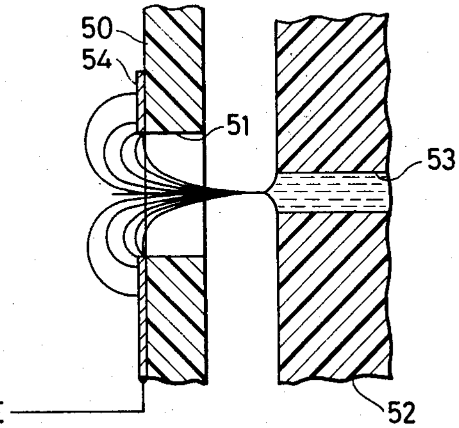
FIG. 12 is an illustration of a further preferred embodiment which is operable at low voltages.
Figure 13:
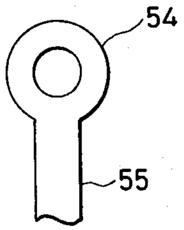
FIG. 13 is an illustration of the ring electrode of FIG. 12.
Figure 14:
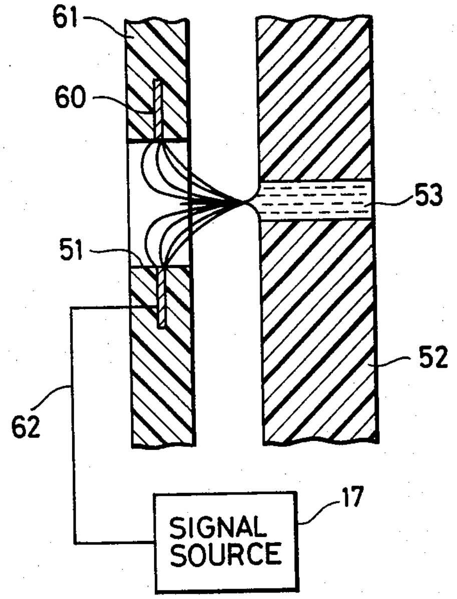
FIG. 14 is an illustration of an alternative embodiment of FIG. 12.

The operating voltage of the printing head can be reduced by modifying the construction of the control electrode. For this purpose embodiments shown in FIGS. 12 to 17 include modified forms of nozzle electrode. In FIGS. 12 and 13, the printing head is formed by an insulative air nozzle plate 50 having an air discharge channel 51 and an insulative rear block 51 formed with a liquid discharge 53. channel To the front face of the nozzle plate 50 is secured a ring-shaped electrode 54 (FIG. 13) encircling the channel 51, the electrode 54 having a strip 55 for connection to the signal source 17. Suitable material for the insulative nozzle plate 50 is quartz crystal or ceramics which permits ultrasonic or laser machining to provide the air discharge channel 51. The electrode 54 is formed by vacuum evaporating, sputtering or electroplating a suitable conductive material which includes platinum, gold, nickel, copper, aluminum, chromium, silver, and titanium oxide. A. 150-micrometer thick laminate of glassfiber-reenforced epoxy resin and copper, known as flexible printed circuit board, could equally be as well used. As it is seen in FIG. 12, the electric field has an increased concentration along the liquid discharge path which causes the liquid to be torn apart at a lower threshold voltage. FIG. 14 is an illustration of an alternative form of the nozzle electrode. In this modification a ring-shaped electrode 60 is embedded in an insulative nozzle plate 61 and electrically connected through a conductive strip 62 to the signal source. The nozzle plate of this construction is formed by coating a high polymer such as aluminum oxide or silicon oxide on a metal or semiconductive ring.

Tests show that the printing heads of FIGS. 12 and 14 rates are capable of operating at voltages of about 400 volts and 200 volts, respectively.

Figure 15:
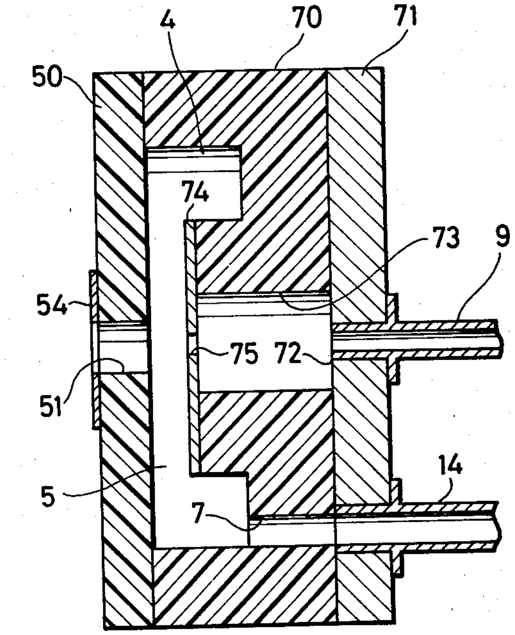
FIG. 15 is an illustration of a further preferred embodiment of the invention.
Figure 16A:
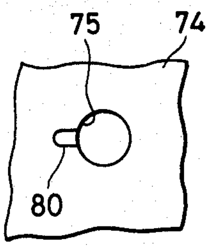
FIGS. 16*a* to 16*d* are illustrations of the front views of the liquid nozzle plate.
Figure 16B:
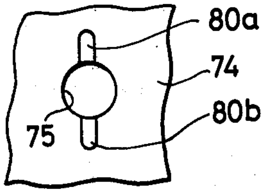
Figure 16C:
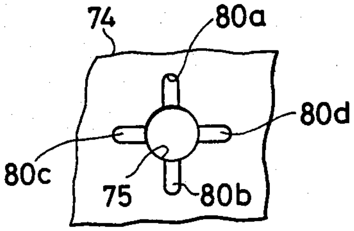
Figure 16D:
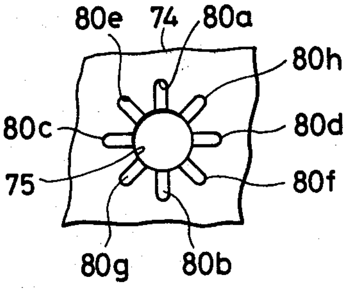

As previously described, the stability of the liquid's meniscus affects the turn-off time of the printing head which in turn determines the maximum repetition frequency of the operating signal. It is found that the viscous resistance of the liquid discharge channel is essential to achieve this purpose. A printing head shown in FIG. 15 is designed to have a reduced viscous resistance value suitable for high frequency operation. This embodiment is generally similar to the FIG. 12 embodiment with the exception that it includes an insulative rear block 70 and a rear plate 71 having an opening 72 in which the supply tube 9 is inserted. The rear block 70 is formed with a liquid chamber 73 which is defined by the rear plate 71 and an orifice plate 74, preferably of a 60-micrometer thick conductive material such as stainless steel, having an orifice 75, preferably 30 to 50 micrometer in diameter, axially aligned with the air discharge channel 51. A typical value of the minimum pulse duration is 400 microseconds.

The minimum pulse duration of the control signal is also affected by the shape of the exit side of the liquid discharge channel. As illustrated in FIGS. 16*a* to 16*d*, the liquid orifice plate 74 is formed on the exit side thereof with one or more of recesses 80 radially extending from the edge of the orifice 75. The formation of such recesses serves to partially distort the liquid's meniscus by capillary action. This reduces the mininum pulse duration to as low as 50 microseconds. To stabilize the pulse duration, the exit side face of the orifice plate 54 is preferably surface treated by an electropolishing technique to form surface irregularities, or coated by an oxide film to keep the edge of the liquid 75 channel under wet condition.

Figure 17:
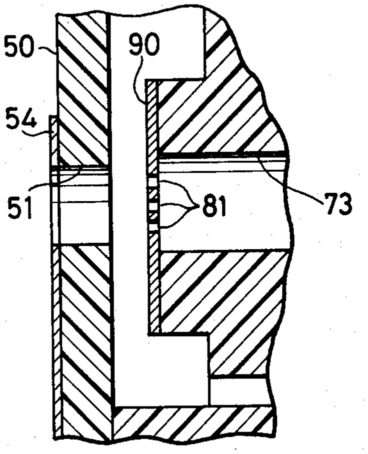
FIG. 17 is an illustration of a modified form of the FIG. 15 embodiment.
Figure 18:
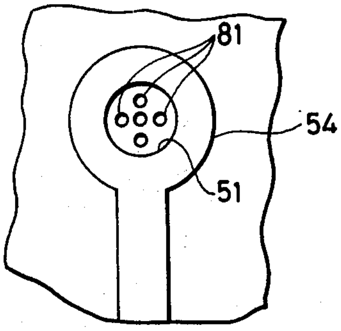
FIG. 18 is a front view of the FIG. 17 embodiment.

The FIG. 15 embodiment is further modified as shown in FIGS. 17 and 18 in which a plurality of liquid orifices 81 is formed in the orifice plate 74. Since the viscous resistance is small in proportion to the orifices 81, the liquid's meniscus is rendered further stabilized, which results in a printing head capable of operation at about 800 volts peak-to-peak with a minimum pulse duration of about 70 microseconds.

Figure 19:
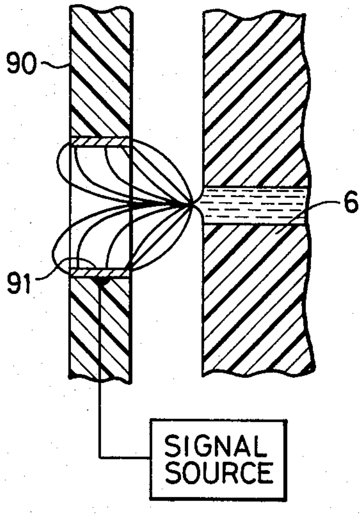
FIGS. 19 to 21 are illustrations of modified embodiments in which the electrode is arranged to keep the discharged droplets from returning to the front panel.
Figure 20:
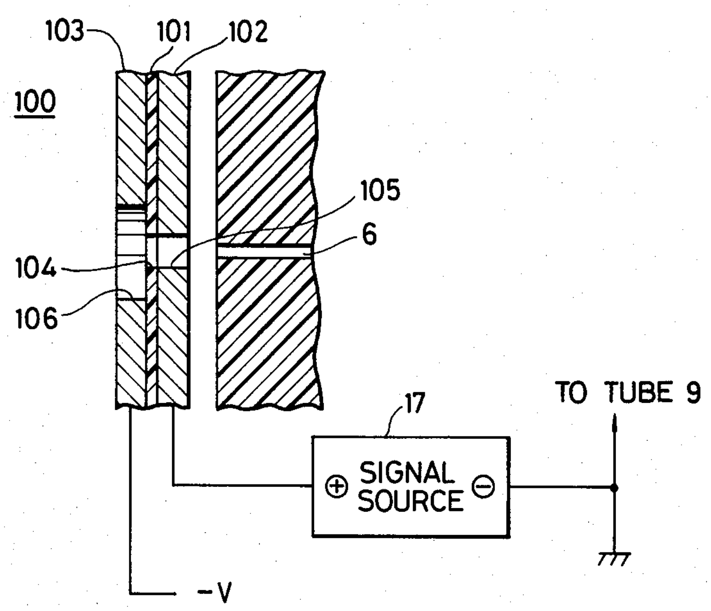
Figure 21:
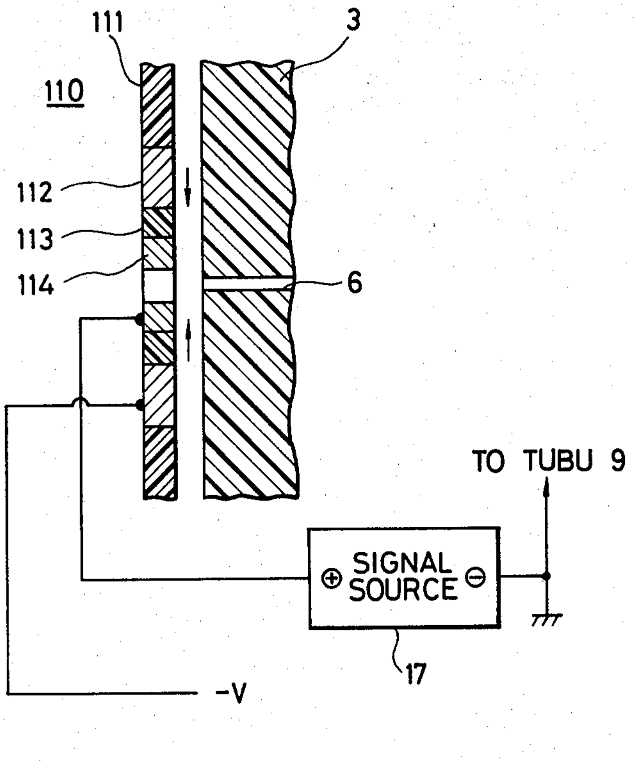

Embodiments shown in FIGS. 19 to 21 are intended to keep the expelled ink droplets from flying off the path to the writing surface by repulsion between charged droplets and returning to the front nozzle plate under the influence of the electric field. In FIG. 19, the insulative nozzle plate 90 has its air discharge channel fitted with a cylindrical electrode 91. The electrode 91 has an outer diameter of smaller than 2 mm. This confines the electric field in an immediate area around the air discharge channel so that it has no effect on the ejected liquid particles. In FIG. 20, the air nozzle plate 100 is a laminate of an insulative orifice plate 101 sandwiched between rear and front conductive plates 102 and 103. The plates 101 and 102 are formed with axially aligned orifices 104 and 105, respectively, and the front plate 103 is formed with an orifice 106 larger than the aligned orifices. The rear plate 102 is connected to a positive terminal of the pulse signal source 17 and the liquid is charged to the ground potential. The front plate 103 is connected to a ground or negative voltage source, not shown. The liquid is propelled under the field established by the rear plate 102 and passes through the orifice 106 of the front plate 103 which then acts as a repeller on the ejected liquid droplets. In FIG. 21, the head includes an air nozzle plate 110 formed by an insulative outer ring portion 111, an outer conductive ring 112, an inner insulative ring 113 and an inner conductive ring 114, all of which are concentrically arranged with respect to the liquid discharge channel 6. The inner conductive ring or electrode 114 is connected to the positive terminal of the pulse signal source 17 and the outer electrode 112 is connected to a ground or negative voltage source in a manner similar to the electrode 103 of FIG. 20.

What is claimed is:

1. An ink jet printing head comprising a laminar airflow chamber having a front channel, a rear channel axially aligned with said front channel connected to a source of liquid and an air intake channel connected to a source of pressurized air for directing an airstream to a point between said front and rear channels so that the airstream makes a sharp turn at the entry into said front channel creating a sharp pressure gradient along a path between the exit ends of said rear and front channels, and means for establishing an electric field between said front channel and the meniscus of the liquid at the exit end of said rear channel to cause said meniscus to extend toward said front channel and to be torn apart into a droplet expelled through said front channel.

2. An ink jet printing head as claimed in claim 1, further comprising a liquid chamber rearwardly of said laminar airflow chamber connected to said rear channel and to said liquid source.

3. An ink jet printing head as claimed in claim 2, further comprising a second rear channel parallel with the first mentioned rear channel substantially aligned with said front channel.

4. An ink jet printing head as claimed in claim 1 or 2, further comprising a member in which said rear channel is formed, said member having a surface which defines the exit end of said rear channel and is formed with a rearwardly recessed portion to partially deform said meniscus.

5. An ink jet printing head as claimed in claim 4, wherein said surface is formed with irregularities in an immediate area around the exit edge of said rear channel.

6. An ink jet printing head as claimed in claim 1, wherein said front channel extends at an acute angle to said airstream flowing from said intake channel to said front channel.

7. An ink jet printing head as claimed in claim 1, wherein said field establishing means comprises a ring electrode.

8. An ink jet printing head as claimed in claim 1, wherein said field establishing means comprises a cylindrical electrode having a throughbore.

9. An ink jet printing head as claimed in claim 1, wherein the ratio of the axial dimension of said chamber to the diameter of said front channel is in a range from 1:1 to 2.5:1.

10. An ink jet printing head as claimed in claim 1 or 9, wherein the diameter of said front channel is less than 250 micrometers.

11. An ink jet printing head as claimed in claim 1, wherein the diameter of said rear channel is less than 100 micrometers.

12. An ink jet printing head as claimed in claim 1, wherein said field establishing means comprises a front panel of an insulative material in which said front channel is formed and a ring electrode provided on the surface of said front panel remote from said rear channel to encircle said front channel.

13. An ink jet printing head as claimed in claim 1, wherein said field establishing means comprises a front panel of an insulative material in which said front channel is formed and a ring electrode embedded in said front panel to encircle said front nozzle.

14. An ink jet printing head as claimed in claim 1, wherein said field establishing means comprises a front panel in which said front channel is formed, said front panel comprising an insulative layer sandwiched between a pair of rear and front conductive layers, said rear conductive layer being adapted to be biased to a given polarity with respect to said liquid, and said front conductive layer being adapted to be biased with respect to said liquid to a polarity opposite to said given polarity.

15. An ink jet printing head as claimed in claim 1, wherein said field establishing means comprises a front panel in which said front channel is formed, said front panel comprising an inner and outer concentrically arranged conductive rings, an inner insulative ring between said inner and outer conductive rings and an outer insulative ring in which said outer conductive ring is disposed, said inner conductive ring being adapted to be biased to a given polarity with respect to said liquid, and said outer conductive ring being adapted to be biased with respect to said liquid to a polarity opposite to said given polarity.

16. An ink jet printing head as claimed in claim 1, wherein said chamber comprises a disk-like chamber.

17. An ink jet printing head as claimed in claim 1, wherein said chamber further comprises an annular chamber surrounding said disk-like chamber and having an axial dimension greater than the axial dimension of said disk-like chamber.

18. An ink jet printer comprising:

a source of pressurized air;

a liquid container; and an ink jet printing head comprising a laminar airflow chamber having a front channel, a rear channel axially aligned with said front channel connected to said liquid container and an air intake channel connected to said pressurized air supply source for directing an airstream to a point between said front and rear channels so that the airstream makes a sharp turn at the entry into said front channel creating a sharp pressure gradient along a path between the exit ends of said rear and front channels, and means for establishing an electric field between said front channel and the meniscus of the liquid at the exit end of said rear channel to cause said meniscus to extend toward said front channel and to be torn apart into a droplet expelled through said front channel, said liquid container being connected to receive air from said pressurized air source so that in the absence of said electric field the liquid pressure in said rear channel is balanced against the combined forces of air pressure acting on said meniscus and the surface tension of the meniscus.

19. An ink jet printer as claimed in claim 18, further comprising means for regulating the air pressure received in said liquid container.

20. An ink jet printer as claimed in claim 18, further comprising a liquid chamber rearwardly of said laminar airflow chamber connected to said rear channel and to said liquid source.

21. An ink jet printer as claimed in claim 20, further comprising a second rear channel parallel with the first mentioned rear channel substantially aligned with said front channel.

22. An ink jet printer as claimed in claim 18 or 20, further comprising a member in which said rear channel is formed, said member having a surface which defines the exit end of said rear channel and is formed with a rearwardly recessed portion to partially deform said meniscus.

23. An ink jet printer as claimed in claim 22, wherein said surface is formed with irregularities in an immediate area around the exit edge of said rear channel.

24. An ink jet printer as claimed in claim 18, wherein said front channel extends at an acute angle to said airstream flowing from said intake channel to said front channel.

25. An ink jet printer as claimed in claim 18, wherein said field establishing means comprises a ring electrode.

26. An ink jet printer as claimed in claim 18, wherein said field establishing means comprises a cylindrical electrode having a throughbore.

27. An ink jet printer as claimed in claim 18, wherein the ratio of the axial dimension of said chamber to the diameter of said front channel is in a range from 1:1 to 2.5:1.

28. An ink jet printer as claimed in claim 18, wherein the diameter of said rear channel is less than 100 micrometers.

29. An ink jet printer as claimed in claim 18, wherein said field establishing means comprises a front panel of an insulative material in which said front channel is formed and a ring electrode provided on the surface of said front panel remote from said rear channel to encircle said front channel.

30. An ink jet printer as claimed in claim 18, wherein said field establishing means comprises a front panel of an insulative material in which said front channel is formed and a ring electrode embedded in said front panel to encircle said front nozzle.

31. An ink jet printer as claimed in claim 18, wherein said field establishing means comprises a front panel in which said front channel is formed, said front panel comprising an insulative layer sandwiched between a pair of rear and front conductive layers, said rear conductive layer being adapted to be biased to a given polarity with respect to said liquid, and said front conductive layer being adapted to be biased with respect to said liquid to a polarity opposite to said given polarity.

32. An ink jet printing head as claimed in claim 18, wherein said field establishing means comprises a front panel in which said front channel is formed, said front panel comprising an inner and outer concentrically arranged conductive rings, an inner insulative ring between said inner and outer conductive rings and an outer insulative ring in which said outer conductive ring is disposed, said inner conductive ring being adapted to be biased to a given polarity with respect to said liquid, and said outer conductive ring being adapted to be biased with respect to said liquid to a polarity opposite to said given polarity.

33. An ink jet printing head as claimed in claim 18, wherein said chamber comprises a disk-like chamber.

34. An ink jet printing head as claimed in claim 18, wherein said chamber further comprises an annular chamber surrounding said disk-like chamber and having an axial dimension greater than the axial dimension of said disk-like chamber.

* * * * *